US012762435B2

(12) United States Patent
Naseem et al.

(10) Patent No.: US 12,762,435 B2
(45) Date of Patent: Oct. 13, 2026

(54) DYNAMIC CALL MODEL PREDICTION

(71) Applicant: MICROSOFT TECHNOLOGY LICENSING, LLC, Redmond, WA (US)

(72) Inventors: Tasneem Khuzema Naseem, Cambridge, MA (US); Steven Rhejohn Barlin So, Burlington, MA (US); Philip To, Lexington, MA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 469 days.

(21) Appl. No.: 18/540,823

(22) Filed: Dec. 14, 2023

(65) Prior Publication Data

US 2025/0200394 A1 Jun. 19, 2025

(51) Int. Cl.

*G06N 5/022* (2023.01)
*H04L 41/14* (2022.01)
*H04L 47/70* (2022.01)

(52) U.S. Cl.

CPC ........... *G06N 5/022* (2013.01); *H04L 41/145* (2013.01); *H04L 47/82* (2013.01)

(58) Field of Classification Search

None

See application file for complete search history.

(56) References Cited

U.S. PATENT DOCUMENTS

| | | | | |
|---|---|---|---|---|
| 9,558,451 | B2 * | 1/2017 | Nilsson | H04L 65/00 |
| 9,614,724 | B2 * | 4/2017 | Menezes | H04L 41/0813 |
| 10,477,426 | B1 * | 11/2019 | Tiwari | H04L 43/0852 |
| 11,003,491 | B1 * | 5/2021 | Gasser | G06N 3/0464 |
| 2006/0209711 | A1 * | 9/2006 | Kerpez | H04B 10/0795 370/252 |
| 2015/0012593 | A1 * | 1/2015 | Phillips | H04L 41/0894 709/204 |
| 2019/0018671 | A1 * | 1/2019 | Zhu | H04L 67/1008 |
| 2019/0280918 | A1 * | 9/2019 | Hermoni | G06F 18/214 |
| 2019/0379592 | A1 * | 12/2019 | Samadi | H04L 41/145 |
| 2021/0274433 | A1 * | 9/2021 | Mhapsekar | H04W 48/16 |
| 2021/0344582 | A1 * | 11/2021 | Samadi | H04L 43/14 |
| 2021/0344612 | A1 * | 11/2021 | Files | H04L 67/535 |

(Continued)

FOREIGN PATENT DOCUMENTS

CN 119496711 A * 2/2025 ............. H04L 41/16

OTHER PUBLICATIONS

"Free Demographic Data Reports by Zip Code", Retrieved From: https://www.cdxtech.com/tools/demographicdata/#:~:text=Welcome%20to%20the%20free%20demographic%20data%20site%20from,zip%20code%20and%20press%20the%20Generate%20Report%20button., Retrieved On: Sep. 28, 2023, 3 Pages.

(Continued)

*Primary Examiner* — Ryan Barrett

(74) *Attorney, Agent, or Firm* — Han Gim; Newport IP, LLC

(57) ABSTRACT

A call model is generated that takes into account location-specific information and target attributes such as throughput per user. A cluster of different machine learning models is utilized to compute dynamic call model characteristics for each location, and merges the outputs into a dynamic call model. Additionally, techniques such as feature vector extraction, clustering algorithms, and ensemble models are employed to improve the accuracy and predictive performance of the machine learning models.

20 Claims, 12 Drawing Sheets

(56) References Cited

U.S. PATENT DOCUMENTS

| | | | | |
|---|---|---|---|---|
| 2022/0052753 | A1* | 2/2022 | Speidel | H04B 7/18513 |
| 2022/0150132 | A1* | 5/2022 | Fiumara | G06F 18/285 |
| 2022/0159637 | A1* | 5/2022 | Kundu | H04B 7/0634 |
| 2022/0164593 | A1* | 5/2022 | Singla | G06F 18/2431 |
| 2023/0010095 | A1* | 1/2023 | Alabbasi | G06N 3/098 |
| 2023/0284082 | A1* | 9/2023 | Wang | H04W 28/0284 370/329 |
| 2023/0388827 | A1* | 11/2023 | Kim | H04L 47/28 |
| 2024/0040434 | A1* | 2/2024 | Pandey | H04W 16/28 |
| 2024/0064064 | A1* | 2/2024 | Zhou | H04W 28/0226 |
| 2024/0292275 | A1* | 8/2024 | Testa | H04L 45/123 |
| 2025/0022013 | A1* | 1/2025 | Miller | G06Q 30/0247 |
| 2025/0103364 | A1* | 3/2025 | So | G06F 9/45558 |
| 2025/0272147 | A1* | 8/2025 | Foukas | G06F 9/5027 |
| 2026/0019822 | A1* | 1/2026 | Alasti | H04W 16/14 |

OTHER PUBLICATIONS

"Our Changing Population: United States", Retrieved From: https://usafacts.org/data/topics/people-society/population-and-demographics/our-changing-population/, Retrieved On: Sep. 28, 2023, 10 Pages.

* cited by examiner

220

Cluster Traffic Model Report

Throughput & CPU Utilization

| | Hours | | | | | | |
|---|---|---|---|---|---|---|---|
| Metrics | 10 | 11 | 12 | 13 | 14 | 15 | 16 |
| Average of sgi_gbps | 62.79 Gbps | 68.54 Gbps | 74.37 Gbps | 75.58 Gbps | 79.38 Gbps | 81.17 Gbps | 79.99 Gbps |
| Average of total_proxy_throughput_Gbps | 51.81 Gbps | 56.35 Gbps | 61.30 Gbps | 62.60 Gbps | 65.59 Gbps | 67.00 Gbps | 66.06 Gbps |
| Average of sgi_mpps | 8.89 MPPS | 9.70 MPPS | 10.50 MPPS | 10.67 MPPS | 11.20 MPPS | 11.45 MPPS | 11.28 MPPS |
| Average of avg_cpu_utilization_io | 14.06 % | 15.47 % | 16.86 % | 17.15 % | 18.06 % | 18.48 % | 18.18 % |
| Average of avg_cpu_utilization_shd | 61.36 % | 67.56 % | 73.73 % | 75.16 % | 78.95 % | 80.09 % | 78.54 % |
| Average of avg_cpu_utilization_proxy | 53.17 % | 56.26 % | 59.40 % | 59.72 % | 61.87 % | 62.56 % | 61.61 % |
| Average of Pct_proxy_over_sgi | 82.51% | 82.21% | 82.41% | 82.81% | 82.63% | 82.56% | 82.60% |
| | | | | | | | |
| Per SHD core @ 75% Projected | 0.4919 | 0.4878 | 0.4849 | 0.4835 | 0.4834 | 0.4872 | 0.4897 |
| Per Proxy core @ 75% Projected | 0.4059 | 0.4010 | 0.3997 | 0.4004 | 0.3994 | 0.4022 | 0.4044 |
| | | | | | | | |
| | 882.6504673 | 883.1730369 | 885.7188574 | 885.5956738 | 885.7048255 | 886.1614601 | 886.6205123 |

FIG. 2C

230

| | Features | | | | | Label |
|---|---|---|---|---|---|---|
| data point 1 | Location | Population | Income Level | Average Age | Education Level | Call Model Attribute Value |
| data point 2 | Location | Population | Income Level | Average Age | Education Level | Call Model Attribute Value |
| data point 3 | Location | Population | Income Level | Average Age | Education Level | Call Model Attribute Value |

FIG. 2D

DYNAMIC CALL MODEL PREDICTION

BACKGROUND

Call models are typically used by network operators to model network usage, which in turn is used to allocate network resources. Network operators typically estimate a call model by obtaining current and previous field data and manually estimating the model and usage. However, such call models are typically generic and not site specific. The modeling of network usage is complex, and the use of a simplified model for different markets can lead to inaccuracies and thus inefficient allocation of resources.

It is with respect to these considerations and others that the disclosure made herein is presented.

SUMMARY

Methods and systems are disclosed for implementing a dynamic call model predictor that incorporates machine learning models to efficiently generate and predict call/traffic models with higher accuracy. The predicted call/traffic models are dynamically and continuously updated. By dynamically/continuously updating the call models, resource allocation can be more accurately predicted and at a finer level of granularity.

In an embodiment a site or location is provided as input to a dynamic call model predictor. The site or location includes the location where a user plane/control plane is to be deployed. The site or location is identifiable with demographic information such as population, age, race, housing, family arrangements, internet and computer usage, education, health, economy, and income. For each of a plurality of target attributes, the dynamic call model predictor computes a corresponding dynamic call model for the target site. In an embodiment, the dynamic call model predictor is a cluster of different machine learning models that are used to generate dynamic call model characteristics. For example, for a target attribute value comprising throughput, a first dynamic call model predictor is generated to compute the throughput per user for each site. The process is repeated for n target attributes and n call models are output. The outputs from the dynamic call model predictor are merged into a complete dynamic call model with n characteristics for the input site.

This Summary is not intended to limit the scope of the claimed subject matter. Furthermore, the claimed subject matter is not limited to implementations that solve any or all disadvantages noted in any part of this disclosure.

DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items.

FIG. 2C is a diagram illustrating an example model report according to one embodiment disclosed herein.

FIG. 2D is a diagram illustrating example features according to one embodiment disclosed herein.

DETAILED DESCRIPTION

Call models are typically used by network operators to model network usage, which in turn is used to allocate network resources in a communications network such as a 5G network. As used herein, a call model is a representation of user behavior at any given location and time that demonstrates or represents the current network traffic based on usage patterns for CPU, memory, and other resources.

Network operators typically estimate a call model by obtaining current and previous field data and manually estimating the model and usage. However, such call models are typically generic and not site specific. The modeling of network usage is complex, and the use of a simplified model for different markets can lead to inaccuracies and thus inefficient allocation of resources.

The present disclosure describes methods and systems for implementing a dynamic call model predictor that incorporates machine learning models to efficiently generate and predict call/traffic models with higher accuracy. The predicted call/traffic models are dynamically and continuously updated. By dynamically/continuously updating the call models, resource allocation can be more accurately predicted and predicted at a finer level of granularity.

In an embodiment, a site or location is provided as input to a dynamic call model predictor. The site or location includes the location where a user plane/control plane is to be deployed. The site or location is identifiable with location-specific information, including demographic information such as population, age, race, housing, family arrangements, internet and computer usage, education, health, economy, and income. For each of a plurality of target attributes, the dynamic call model predictor computes a corresponding dynamic call model for the target site. In an embodiment, the dynamic call model predictor comprises a cluster of different machine learning models that are used to generate dynamic call model characteristics. For example, for a target attribute value comprising throughput, a first dynamic call model predictor is generated to compute the throughput per user for each site. The process is repeated for n target attributes and n call models are output. The outputs from the dynamic call model predictor are merged into a complete dynamic call model with n characteristics for the input site.

Referring to the appended drawings, in which like numerals represent like elements throughout the several FIGURES, aspects of various technologies for video super resolution using motion vectors will be described. In the following detailed description, references are made to the accompanying drawings that form a part hereof, and which are shown by way of illustration specific configurations or examples.

Figure 1:
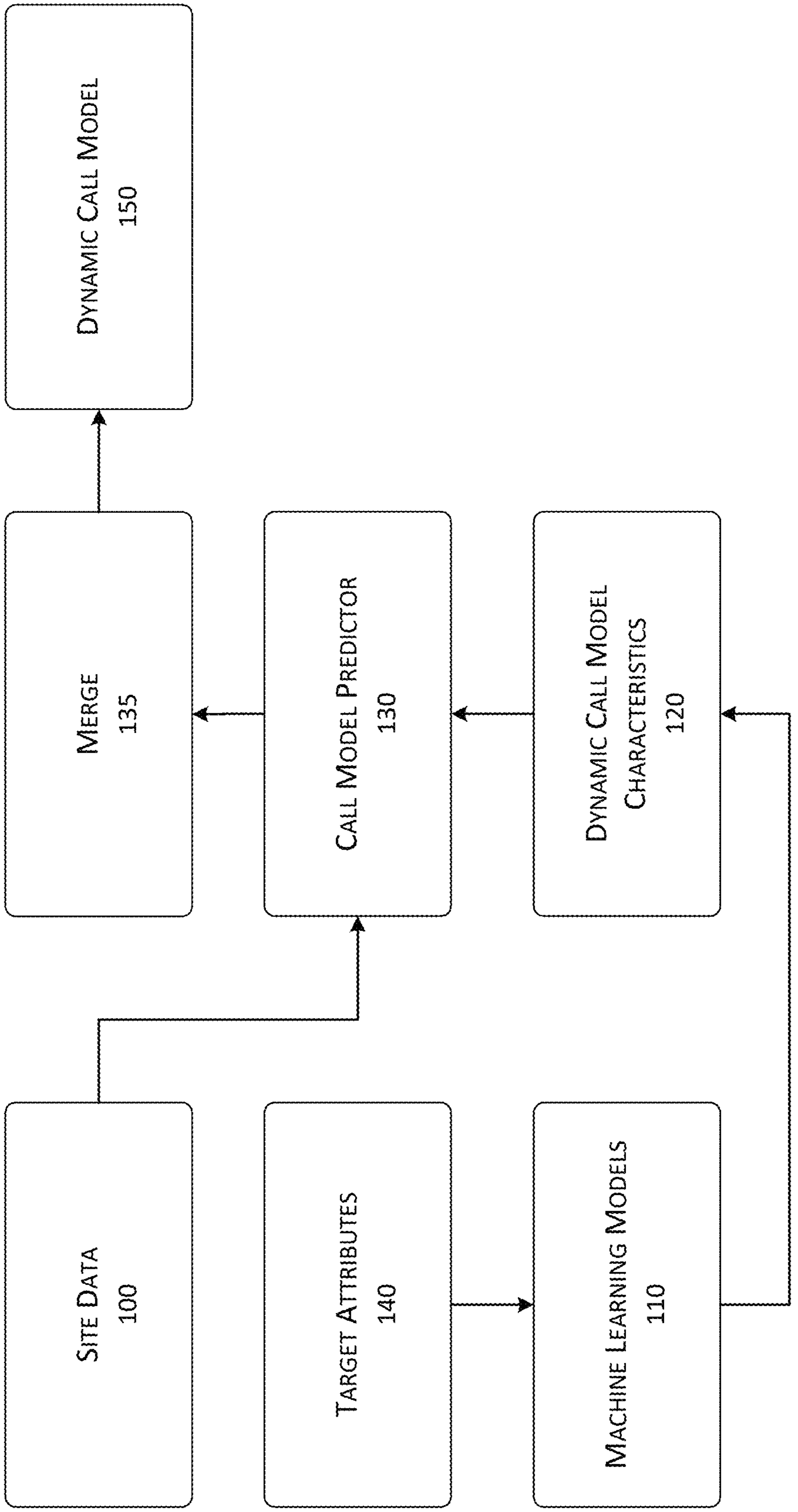
FIG. 1 is a diagram illustrating the disclosed techniques according to one embodiment disclosed herein.

With reference to FIG. 1, a call model 150 is generated that is usable by a mobile communications network operator to model network usage. Site data 100 is received that is indicative of a location where a user plane and control plane is to be deployed in a telecommunications network. The location is identifiable by location-specific information. The site data can comprise the location-specific information associated with the location. A plurality of target attributes 140 indicative of capabilities of the telecommunications network is determined.

The site data is input to a dynamic call model predictor 130. The dynamic call model predictor 130 comprises a plurality of different machine learning models 110 that are each configured to generate a dynamic call model characteristic 120 associated with one of the plurality of target attributes 140. For each of the plurality of target attributes 140, the dynamic call model predictor 130 can be used to compute a corresponding dynamic call model 150 for the location. The dynamic call model predictor 130 comprises a cluster of different machine learning models 110 that are configured to generate dynamic call model characteristics 120.

The dynamic call model characteristics 120 generated by the plurality of different machine learning models 110 of the dynamic call model predictor 130 are merged 135 into dynamic call model 150. The dynamic call mode characteristics 120 are merged to correspond to a representation of computing and network resources of the telecommunications network. Merging the outputs can be performed so as to enable the allocation of resources in a network based on the dynamic call model characteristics. Merging can include averaging, adding, dimensional transformation, mapping, or other techniques in order to determine a specific allocation of resources in the network to achieve the target attributes.

Figure 2A:
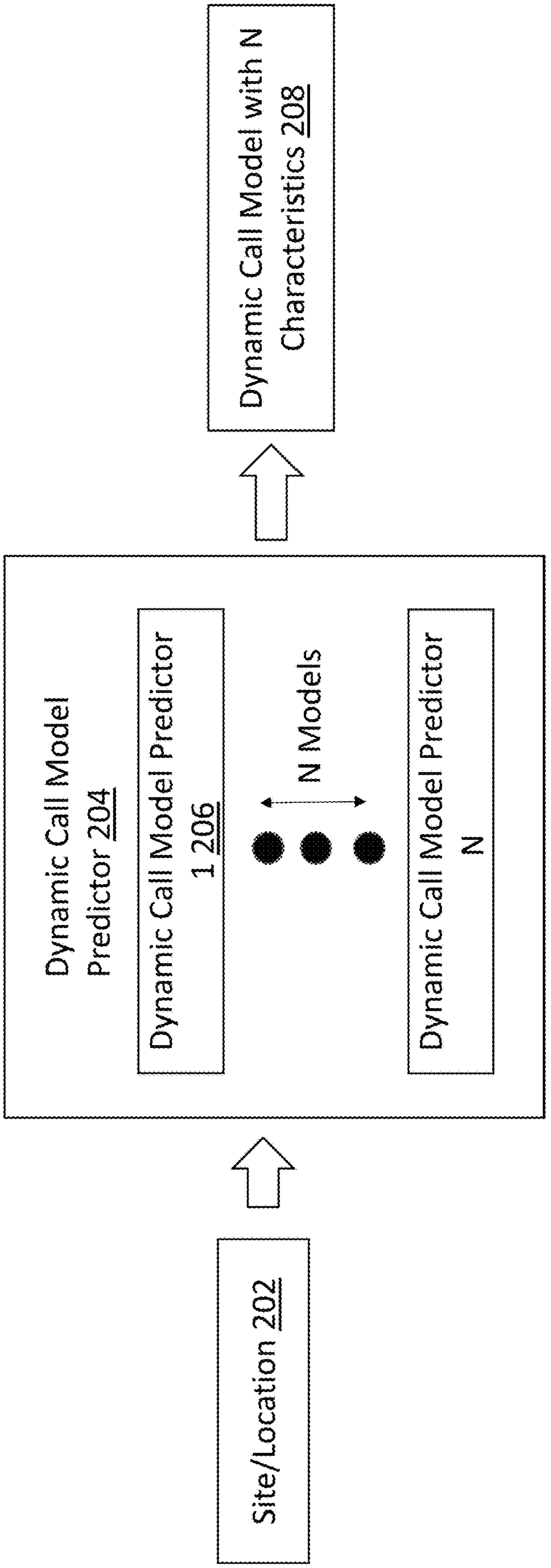
FIG. 2A is a diagram illustrating a call model predictor according to one embodiment disclosed herein.

With reference to FIG. 2A, site/location 202 is provided as input to the dynamic call model predictor 204 and includes the location where a user plane/control plane is to be deployed. Site/location 202 is identifiable with demographic information such as population, age, race, housing, family arrangements, internet and computer usage, education, health, economy, and income.

For each of a plurality of target attributes, the dynamic call model predictor 204 computes a corresponding dynamic call model for the target site. In an embodiment, the dynamic call model predictor 204 is a cluster of different machine learning models that are used to generate dynamic call model characteristics. For example, for a target attribute value (1) comprising throughput, dynamic call model predictor 1 206 is generated to compute the throughput per user for each site. The process is repeated for n target attributes and n call models are output.

The outputs from the dynamic call model predictor 204 are merged into a complete dynamic call model with n characteristics 208 for the input site.

Figure 2B:
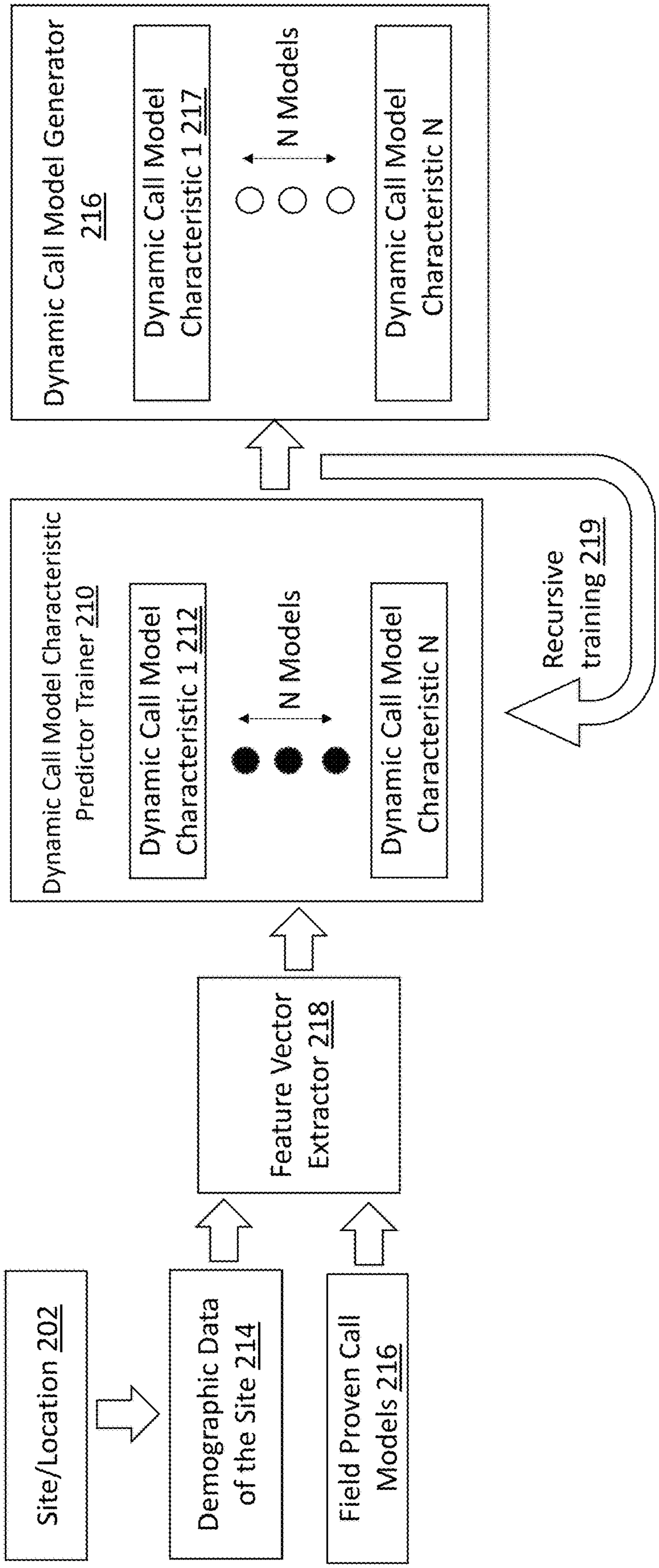
FIG. 2B is a diagram illustrating a call model predictor trainer according to one embodiment disclosed herein.

FIG. 2B illustrates an example flow diagram illustrating training in conjunction with the disclosed embodiments. The user plane/control plane site location 202 is provided as the initial input. The demographic data 214 can be collected, for example, from the American Community Survey, US Census Bureau, or local government agencies or other sources and used as an input to identify locations.

With reference to FIG. 2B, a feature vector extractor 218 combines high-dimensional demographic data 214 and field call models 216 and transforms the combined data into a low-dimensional space while maintaining the meaningful properties of the attributes in the original data. The results are analyzed and labelled with call model attribute values. The table illustrated in FIG. 2C illustrates some example metrics in the field call model at an example location.

Figure 2E:
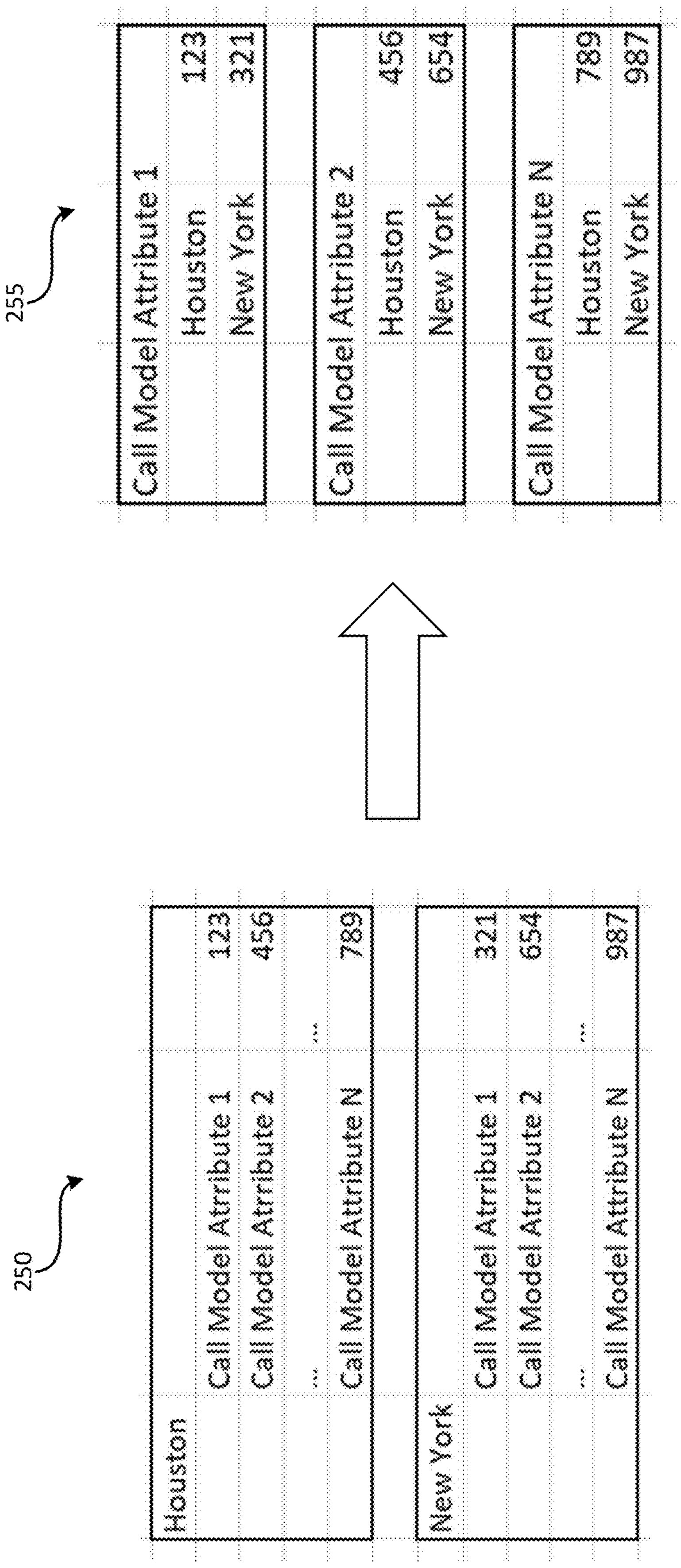
FIG. 2E is a diagram illustrating example attributes according to one embodiment disclosed herein.

FIG. 2D illustrates example data points with example features and labels. The data is further transformed into call model characteristics (1 to n) for each site, as shown in FIG. 2E.

In an embodiment, dimensionality reduction of the dataset is performed using the principal component analysis (PCA) technique that linearly transforms the data into a new coordinate system that can be described with fewer dimensions than the initial data. An optimal number of clusters can be obtained using the Elbow method, and a K-Means algorithm is applied to cluster the data. Merging the outputs can be performed so as to enable the allocation of resources in a network based on the dynamic call model characteristics.

In some embodiments, with reference to FIG. 2B, a dynamic call model characteristic predictor trainer 210 is provided, where feature vectors are trained to dynamic call model characteristics 212 with an ML model 213 for each target attribute. Sites can be grouped based on user behavior obtained from the call model, and can be grouped using clustering algorithms including K-means clustering, hierarchical clustering, Density-Based Spatial Clustering of Applications with Noise (DBSCAN), and Gaussian mixed models.

For a target attribute value 1, dynamic call model characteristic 1 212 is generated that computes the target attribute value 1 for each site. The process is repeated for n target attributes and n dynamic call models are output. The feature vectors are split into training data used to train the regression model and the test data is used to evaluate the final model.

An optimal machine learning model can be determined by tuning hyperparameters. Additionally, ensemble models can be used to improve ML results and predictive performance by combining multiple models.

The output of call model characteristic generator trainer 210 is the final optimized ML model that will be used to predict call models. This optimized ML model is provided to the call model generator 204 of FIG. 2A.

Figure 2F:
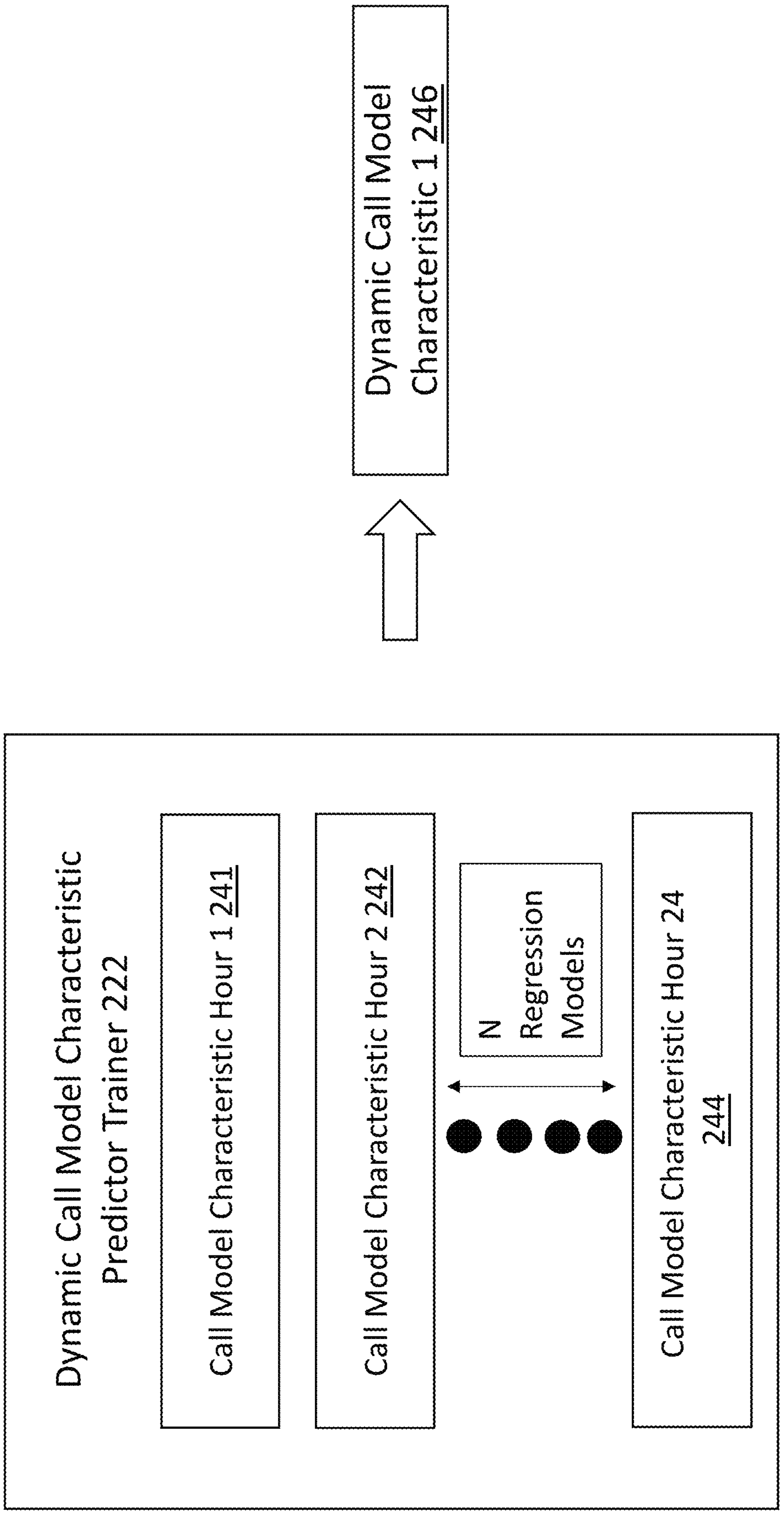
FIG. 2F is a diagram illustrating another example of a call model predictor trainer according to one embodiment disclosed herein.

Referring to FIG. 2F, for each call model characteristic that is provided to the dynamic call model characteristic predictor trainer 220, an ML model is generated for a given period of time (e.g., each hour) to incorporate the trends in usage throughout the day or other time period. FIG. 2F illustrates Call Model Characteristic Hour 1 (241), Call Model Characteristic Hour 2 (242), through Call Model Characteristic Hour 24 (244).

For each call model characteristic an ML model is generated for, example for 24 hours of the day. This process can be repeated 24 times to generate call model characteristic per hour of the day for a full day. Based on the Call Model Characteristic Hour 1 through the Call Model Characteristic Hour 24, a single Dynamic Call Model Characteristic 1 (246) is generated. This process is repeated n times to create n Dynamic Call Model Characteristics. Dimensionality reduction can be used to merge outputs in order to determine a specific allocation of resources in the network to achieve the target attributes. This enables the Dynamic Call Model Characteristics to be translated into a specific set of configurable network resources such as processing capacity, storage capacity, bandwidth allocations, and so forth.

Figure 3:
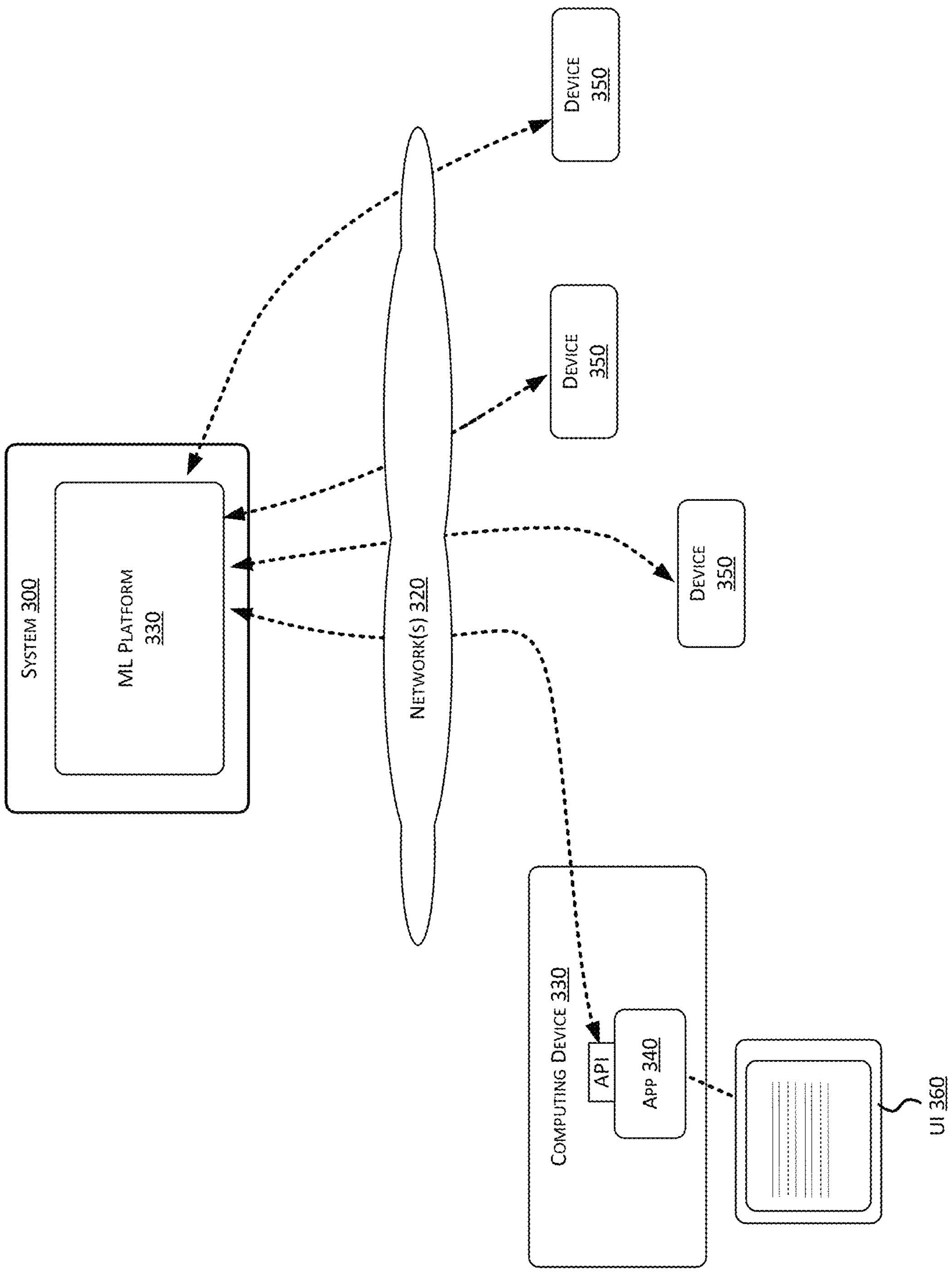
FIG. 3 is a diagram showing aspects of an example system according to one embodiment disclosed herein.

In various embodiments, the machine learning model(s) may be run locally on the client. In other embodiments, the machine learning inferencing can be performed on a server of a network. For example, in the system illustrated in FIG. 3, a system 300 is illustrated that implements ML platform 330. The ML platform 330 may be configured to provide output data to various devices 350 over a network 320, as well as computing device 330. A user interface 360 may be rendered on computing device 330. The user interface 360 may be provided in conjunction with an application 340 that communicates to the ML platform 330 using an API via network 320. In some embodiments, system 300 may be configured to provide call model information to users. In one example, ML platform 330 may implement a machine learning system to perform one or more tasks. The ML platform 330 utilizes the machine learning system to perform tasks such as call model generation. The machine learning system may be configured to be optimized using the techniques described herein.

Figure 4:
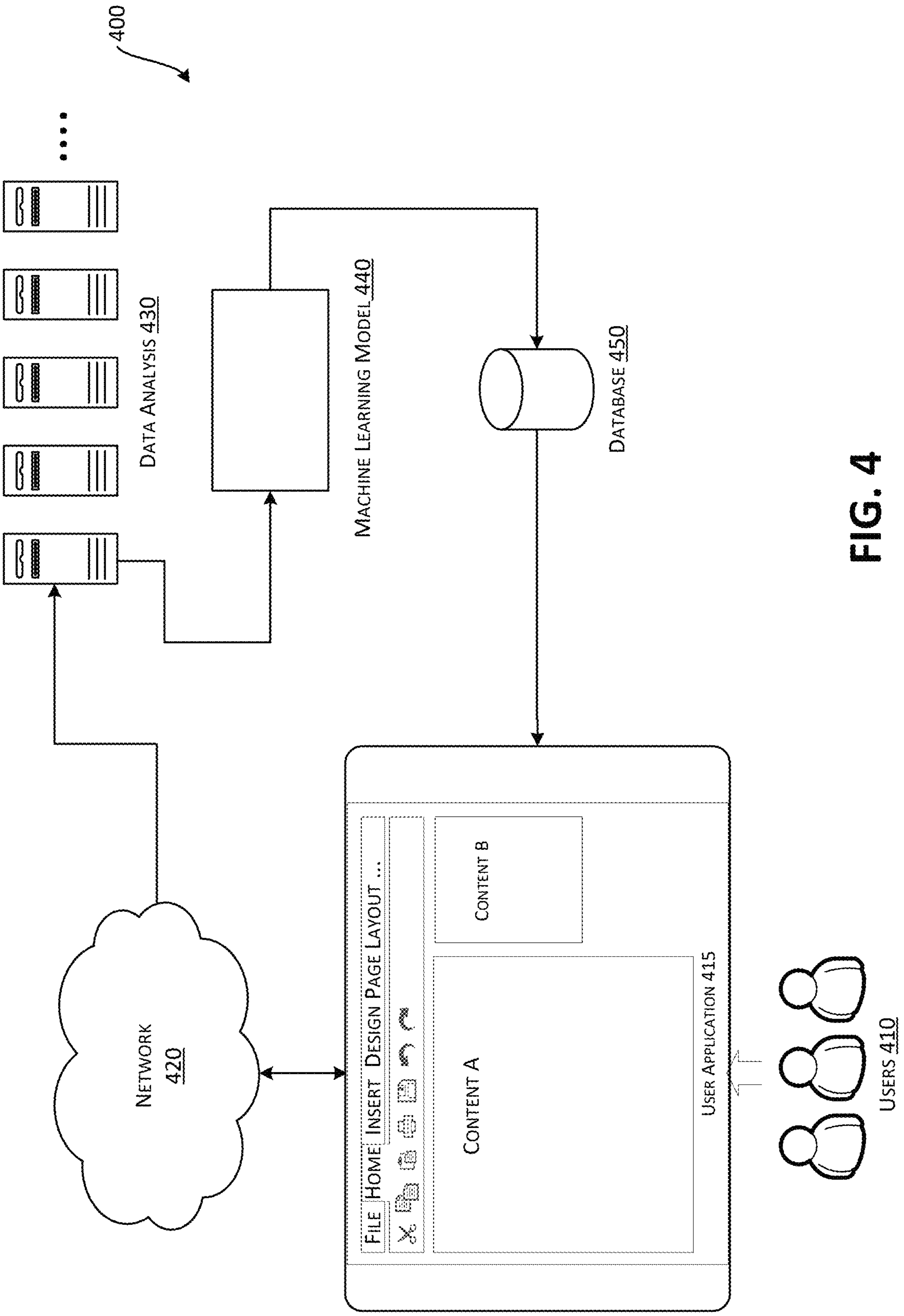
FIG. 4 is a diagram showing aspects of an example system according to one embodiment disclosed herein.

FIG. 4 is a computing system architecture diagram showing an overview of a system disclosed herein for implementing a machine learning model, according to one embodiment disclosed herein. As shown in FIG. 4, a machine learning system 400 may be configured to perform analysis and perform identification, prediction, or other functions based upon various data collected by and processed by data analysis components 430 (which might be referred to individually as an "data analysis component 430" or collectively as the "data analysis components 430"). The data analysis components 430 may, for example, include, but are not limited to, physical computing devices such as server computers or other types of hosts, associated hardware components (e.g., memory and mass storage devices), and networking components (e.g., routers, switches, and cables). The data analysis components 430 can also include software, such as operating systems, applications, and containers, network services, virtual components, such as virtual disks, virtual networks, and virtual machines. Database 450 can include data, such as a database, or a database shard (i.e., a partition of a database). Feedback may be used to further update various parameters that are used by machine learning model 420. Data may be provided to the user application 415 to provide results to various users 410 using a user application 415. In some configurations, machine learning model 420 may be configured to utilize supervised and/or unsupervised machine learning technologies. A model compression framework based on sparsity-inducing regularization optimization as disclosed herein can reduce the amount of data that needs to be processed in such systems and applications. Effective model compression when processing iterations over large amounts of data may provide improved latencies for a number of applications that use such technologies, such as image and sound recognition, recommendation systems, and image analysis.

Figure 5:
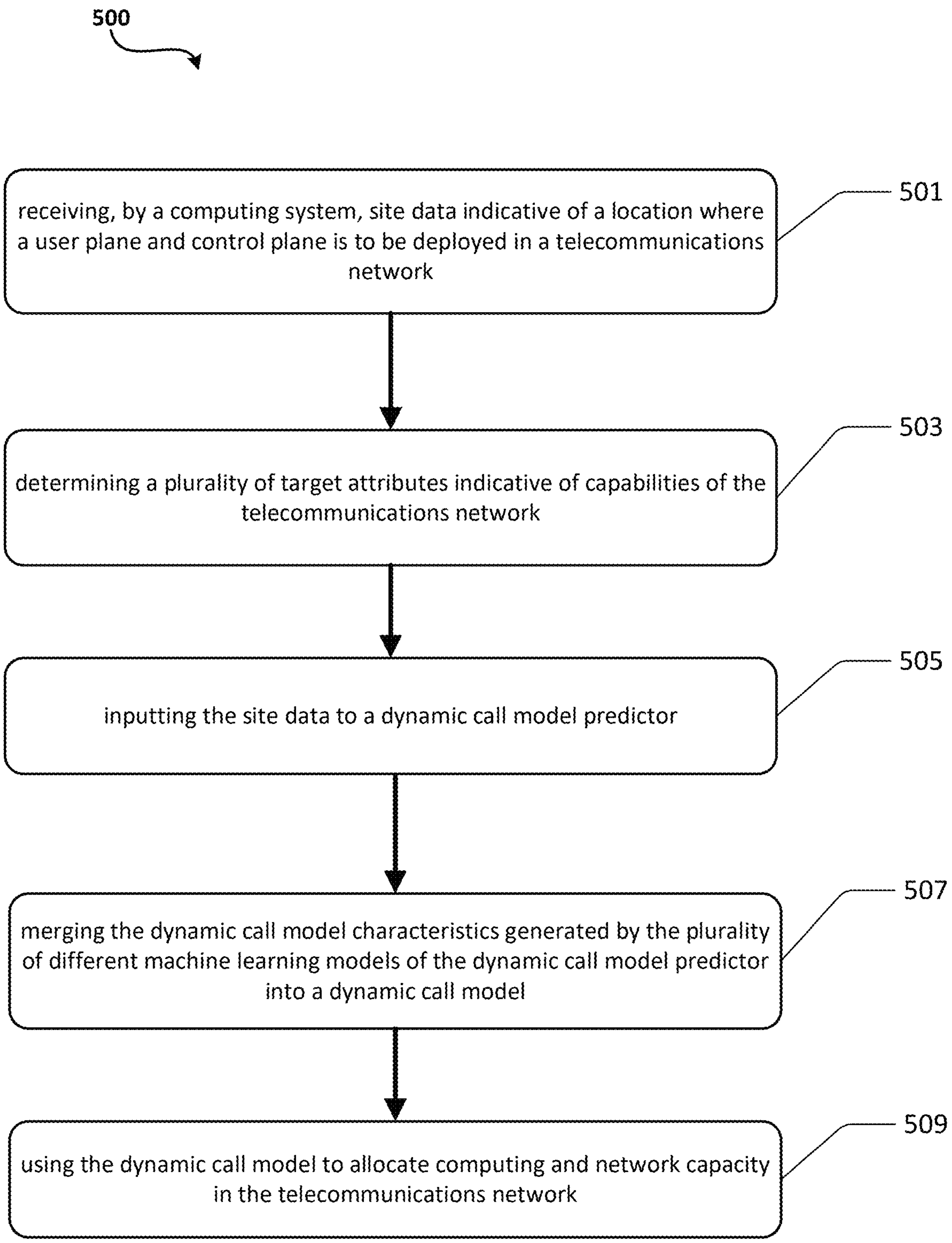
FIG. 5 is a flow diagram showing aspects of an illustrative routine, according to one embodiment disclosed herein.

Turning now to FIG. 5, illustrated is an example operational procedure for generating a call model usable by a telecommunications network operator to model network usage in accordance with the present disclosure. The operational procedure may be implemented in a system comprising one or more computing devices.

It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Referring to FIG. 5, operation 501 illustrates receiving, by a computing system, site data indicative of a location where a user plane and control plane is to be deployed in a telecommunications network. In an embodiment, the site data comprises location-specific information associated with the location.

Operation 503 illustrates determining a plurality of target attributes indicative of capabilities of the telecommunications network.

Operation 505 illustrates inputting the site data to a dynamic call model predictor. In an embodiment, the dynamic call model predictor comprises a plurality of different machine learning models that are each configured to generate a dynamic call model characteristic associated with one of the plurality of target attributes.

Operation 507 illustrates merging the dynamic call model characteristics generated by the plurality of different machine learning models of the dynamic call model predictor into a dynamic call model. In an embodiment, the dynamic call mode characteristics are merged to correspond to a representation of computing and network resources of the telecommunications network.

Operation 509 illustrates using the dynamic call model to allocate computing and network capacity in the telecommunications network.

Figure 6:
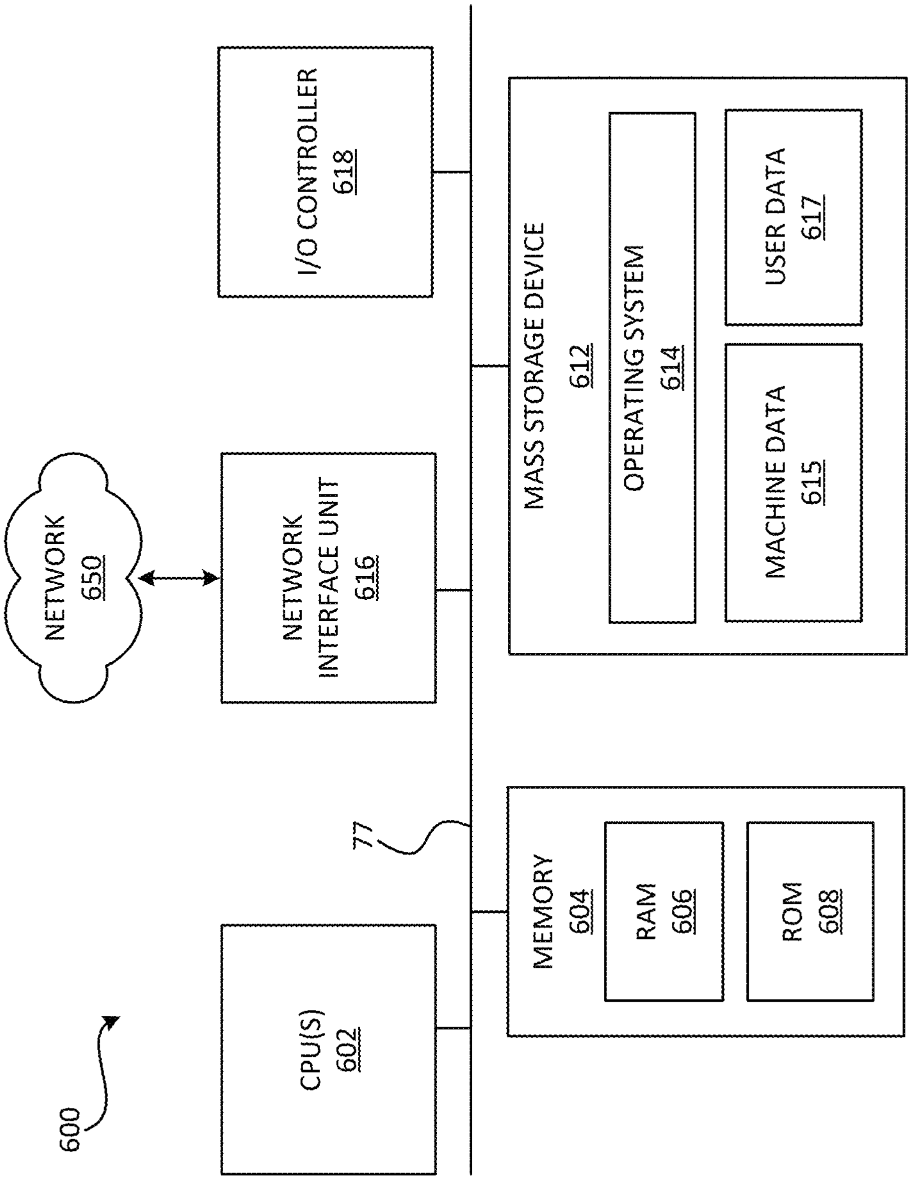
FIG. 6 is a computer architecture diagram illustrating aspects of an example computer architecture for a computer capable of executing the software components described herein.

FIG. 6 shows an example computer architecture for a computer capable of providing the functionality described herein such as, for example, a computing device configured to implement the functionality described above with reference to FIGS. 1-6. Thus, the computer architecture 600 illustrated in FIG. 6 illustrates an architecture for a server computer or another type of computing device suitable for implementing the functionality described herein. The computer architecture 600 might be utilized to execute the various software components presented herein to implement the disclosed technologies.

The computer architecture 600 illustrated in FIG. 6 includes a central processing unit 602 ("CPU"), a system memory 604, including a random-access memory 606 ("RAM") and a read-only memory ("ROM") 608, and a system bus 77 that couples the memory 604 to the CPU 602. A firmware containing basic routines that help to transfer information between elements within the computer architecture 600, such as during startup, is stored in the ROM 608. The computer architecture 600 further includes a mass storage device 612 for storing an operating system 614, other data, such as product data 615 or user data 617.

The mass storage device 612 is connected to the CPU 602 through a mass storage controller (not shown) connected to the bus 77. The mass storage device 612 and its associated computer-readable media provide non-volatile storage for the computer architecture 600. Although the description of computer-readable media contained herein refers to a mass storage device, such as a solid-state drive, a hard disk or optical drive, it should be appreciated by those skilled in the art that computer-readable media can be any available computer storage media or communication media that can be accessed by the computer architecture 600.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media might include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 600. For purposes of the claims, the phrase "computer storage medium," "computer-readable storage medium" and variations thereof, does not include waves, signals, and/or other transitory and/or intangible communication media, per se.

According to various implementations, the computer architecture 600 might operate in a networked environment using logical connections to remote computers through a network 650 and/or another network (not shown). A computing device implementing the computer architecture 600 might connect to the network 650 through a network interface unit 616 connected to the bus 77. It should be appreciated that the network interface unit 616 might also be utilized to connect to other types of networks and remote computer systems.

The computer architecture 600 might also include an input/output controller 618 for receiving and processing input from a number of other devices, including a keyboard, mouse, or electronic stylus (not shown in FIG. 6). Similarly, the input/output controller 618 might provide output to a display screen, a printer, or other type of output device (also not shown in FIG. 6).

It should be appreciated that the software components described herein might, when loaded into the CPU 602 and executed, transform the CPU 602 and the overall computer architecture 600 from a general-purpose computing system into a special-purpose computing system customized to facilitate the functionality presented herein. The CPU 602 might be constructed from any number of transistors or other discrete circuit elements, which might individually or collectively assume any number of states. More specifically, the CPU 602 might operate as a finite-state machine, in response to executable instructions contained within the software modules disclosed herein. These computer-executable instructions might transform the CPU 602 by specifying how the CPU 602 transitions between states, thereby transforming the transistors or other discrete hardware elements constituting the CPU 602.

Encoding the software modules presented herein might also transform the physical structure of the computer-readable media presented herein. The specific transformation of physical structure might depend on various factors, in different implementations of this description. Examples of such factors might include, but are not limited to, the technology used to implement the computer-readable media, whether the computer-readable media is characterized as primary or secondary storage, and the like. If the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software might also transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of locations within given magnetic media. These transformations might also include altering the physical features or characteristics of locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 600 in order to store and execute the software components presented herein. It also should be appreciated that the computer architecture 600 might include other types of computing devices, including hand-held computers, embedded computer systems, personal digital assistants, and other types of computing devices known to those skilled in the art.

It is also contemplated that the computer architecture 600 might not include all of the components shown in FIG. 6, might include other components that are not explicitly shown in FIG. 6, or might utilize an architecture completely different than that shown in FIG. 6. For example, and without limitation, the technologies disclosed herein can be utilized with multiple CPUS for improved performance through parallelization, graphics processing units ("GPUs") for faster computation, and/or tensor processing units ("TPUs"). The term "processor" as used herein encompasses CPUs, GPUs, TPUs, and other types of processors.

Figure 7:
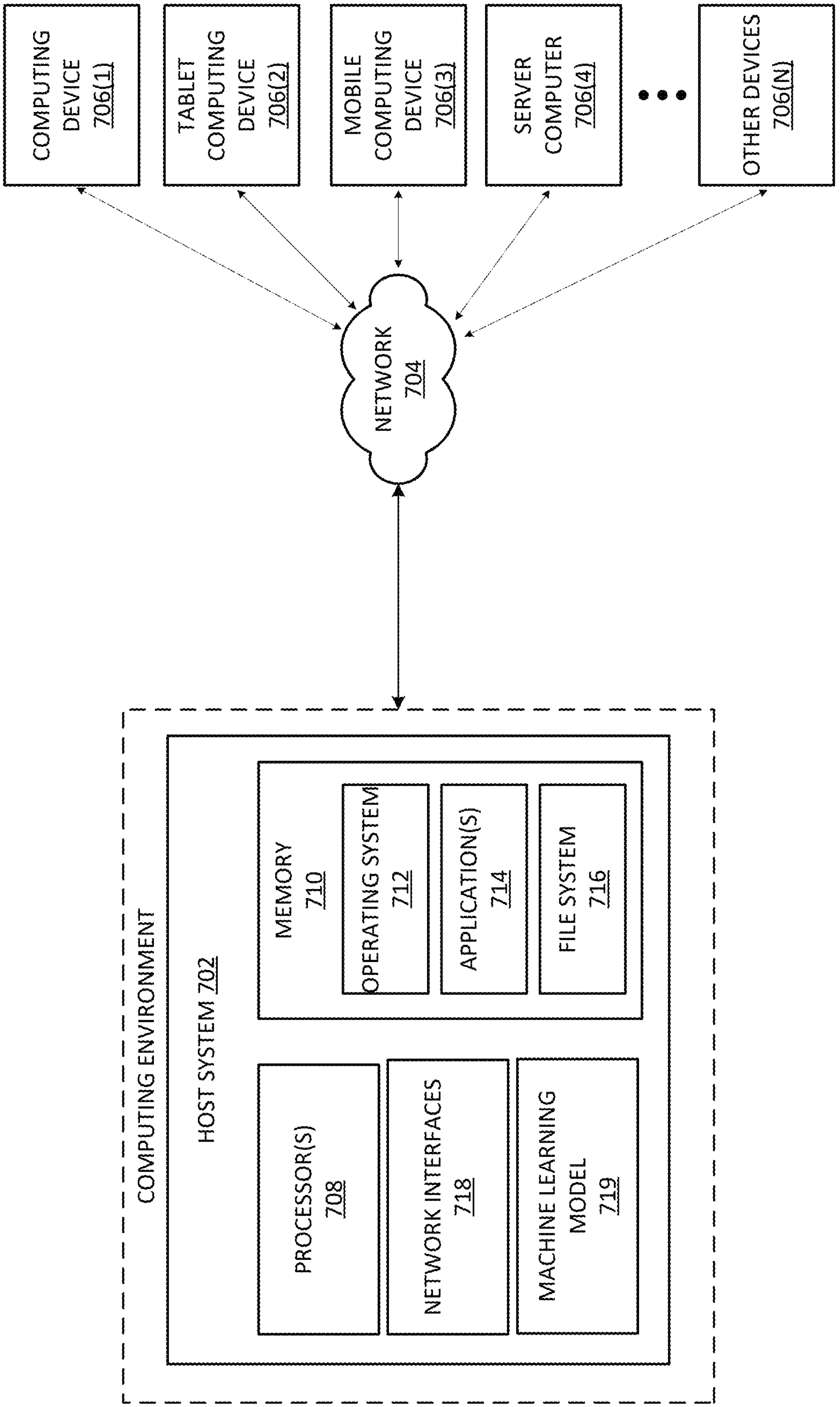
FIG. 7 is a data architecture diagram showing an illustrative example of a computer environment.

FIG. 7 illustrates an example computing environment capable of executing the techniques and processes described above with respect to FIGS. 1-6. In various examples, the computing environment comprises a host system 702. In various examples, the host system 702 operates on, in communication with, or as part of a network 704.

The network 704 can be or can include various access networks. For example, one or more client devices 706(1) . . . 706(N) can communicate with the host system 702 via the network 704 and/or other connections. The host system 702 and/or client devices can include, but are not limited to, any one of a variety of devices, including portable devices or stationary devices such as a server computer, a smart phone, a mobile phone, a personal digital assistant (PDA), an electronic book device, a laptop computer, a desktop computer, a tablet computer, a portable computer, a gaming console, a personal media player device, or any other electronic device.

According to various implementations, the functionality of the host system 702 can be provided by one or more servers that are executing as part of, or in communication with, the network 704. A server can host various services, virtual machines, portals, and/or other resources. For example, a can host or provide access to one or more portals, Web sites, and/or other information.

The host system 702 can include processor(s) 708 memory 710. The memory 710 can comprise an operating system 712, application(s) 714, and/or a file system 716. Moreover, the memory 710 can comprise the storage unit(s) 82 described above with respect to FIGS. 1-5.

The processor(s) 708 can be a single processing unit or a number of units, each of which could include multiple different processing units. The processor(s) can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) may be configured to fetch and execute computer-readable instructions stored in the memory 710.

The memory 710 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random-access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The host system 702 can communicate over the network 704 via network interfaces 718. The network interfaces 718 can include various types of network hardware and software for supporting communications between two or more devices. The host system 702 may also include machine learning model 719.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The disclosure presented herein also encompasses the subject matter set forth in the following clauses:

Clause 1: A method of generating a call model usable by a telecommunications network operator to model network usage, the method comprising:

receiving, by a computing system, site data indicative of a location where a user plane and control plane is to be deployed in a telecommunications network, wherein the site data comprises location-specific information associated with the location;

determining a plurality of target attributes indicative of capabilities of the telecommunications network;

inputting the site data to a dynamic call model predictor, wherein the dynamic call model predictor comprises a plurality of different machine learning models that are each configured to generate a dynamic call model characteristic associated with one of the plurality of target attributes;

merging the dynamic call model characteristics generated by the plurality of different machine learning models of the dynamic call model predictor into a dynamic call model, wherein the dynamic call mode characteristics are merged to correspond to a representation of computing and network resources of the telecommunications network; and using the dynamic call model to allocate computing and network capacity in the telecommunications network.

Clause 2: The method of clause 1, wherein the location-specific information comprises one or more of population, age, race, housing, family arrangements, internet and computer usage, education, health, economy, or income.

Clause 3: The method of any of clauses 1-2, wherein the target attributes comprises one or more of throughput or CPU utilization.

Clause 4: The method of any of clauses 1-3, further comprising using a feature vector extractor to:

combine high-dimensional demographic data and field call models and transform the combined data into a low-dimensional space;

analyze data in the low-dimensional space; and label the analyzed data with call model attribute values.

Clause 5: The method of any of clauses 1-4, wherein transforming the combined data comprises using Principal Component Analysis.

Clause 6: The method of any of clauses 1-5, further comprising determining an optimal number of clusters using the Elbow method and applying a K-Means algorithm to cluster the data.

Clause 7: The method of clauses 1-6, wherein the cluster of different machine learning models are trained by a dynamic call model characteristic predictor trainer, wherein feature vectors are trained to dynamic call model characteristics with a machine learning model for each target attribute.

Clause 8: The method of any of clauses 1-7, wherein sites are grouped based on user behavior obtained from the dynamic call model and by using clustering algorithms.

Clause 9: The method of any of clauses 1-8, wherein the clustering algorithms comprise one of K-means clustering, hierarchical clustering, DBSCAN, and Gaussian mixed models.

Clause 10: The method of any of clauses 1-9, wherein the feature vectors are divided into training data used to train a regression model and wherein test data is used to evaluate a final model.

Clause 11: The method of any of clauses 1-10, wherein an optimal machine learning model is obtained by tuning hyperparameters.

Clause 12: The method of any of clauses 1-11, further comprising using ensemble models to improve machine learning results and predictive performance.

Clause 13: The method of any of clauses 1-12, wherein for each call model characteristic that is input to the dynamic call model characteristic predictor trainer, an ML model is generated for each of a selected time period to incorporate trends in usage throughout a predetermined time period.

Clause 14: A computing system, comprising:

one or more processors; and a computer-readable storage medium having computer-executable instructions stored thereupon which, when executed by the processor, cause the computing system to perform operations comprising:

accessing site data indicative of a location where a user plane and control plane is to be deployed in a telecommunications network, wherein the site data comprises location-specific information associated with the location;

inputting the site data to a dynamic call model predictor, wherein the dynamic call model predictor comprises a plurality of different machine learning models that are each configured to generate a dynamic call model characteristic associated with one of a plurality of target attributes indicative of capabilities of the telecommunications network;

merging the dynamic call model characteristics generated by the plurality of different machine learning models of the dynamic call model predictor into a dynamic call model; and using the dynamic call model to allocate computing and network capacity in the telecommunications network.

Clause 15: The computing system of clause 14, wherein the location-specific information comprises one or more of population, age, race, housing, family arrangements, internet and computer usage, education, health, economy, or income.

Clause 16: The computing system of any of clauses 14 and 15, wherein the target attributes comprises one or more of throughput or CPU utilization.

Clause 17: A computer-readable storage medium having computer-executable instructions stored thereupon which, when executed by a processor of a computing system, cause the computing system to perform operations comprising:

receiving site data indicative of a location where a user plane and control plane is to be deployed in a telecommunications network, wherein the site data comprises location-specific information associated with the location;

receiving a plurality of target attributes indicative of capabilities of the telecommunications network;

inputting the site data to a dynamic call model predictor, wherein the dynamic call model predictor comprises a plurality of different machine learning models that are each configured to generate a dynamic call model characteristic associated with one of the plurality of target attributes;

merging the dynamic call model characteristics generated by the plurality of different machine learning models of the dynamic call model predictor into a dynamic call model, wherein the dynamic call mode characteristics are merged to correspond to a representation of computing and network resources of the telecommunications network; and outputting the dynamic call model to allocate computing and network capacity in the telecommunications network.

Clause 18: The computer-readable storage medium of clause 17, further comprising computer-executable instructions stored thereupon which, when executed by the processor, cause the computing system to perform operations comprising:

using a feature vector extractor to:

combine high-dimensional demographic data and field call models and transform the combined data into a low-dimensional space;

analyze data in the low-dimensional space; and label the analyzed data with call model attribute values.

Clause 19: The computer-readable storage medium of any of clauses 17 and 18, wherein transforming the combined data comprises using Principal Component Analysis.

Clause 20: The computer-readable storage medium of any of the clauses 17-19, further comprising computer-executable instructions stored thereupon which, when executed by the processor, cause the computing system to perform operations comprising determining an optimal number of clusters using the Elbow method and applying a K-Means algorithm to cluster the data.

What is claimed is:

1. A method of generating a call model usable by a telecommunications network operator to model network usage, the method comprising:

receiving, by a computing system, site data indicative of a location where a user plane and control plane is to be deployed in a telecommunications network, wherein the site data comprises location-specific information associated with the location;

determining a plurality of target attributes indicative of capabilities of the telecommunications network;

inputting the site data to a dynamic call model predictor, wherein the dynamic call model predictor comprises a plurality of different machine learning models that are each configured to generate a dynamic call model characteristic associated with one of the plurality of target attributes;

merging the dynamic call model characteristics generated by the plurality of different machine learning models of the dynamic call model predictor into a dynamic call model, wherein the dynamic call mode characteristics are merged to correspond to a representation of computing and network resources of the telecommunications network; and using the dynamic call model to allocate computing and network capacity in the telecommunications network.

2. The method of claim 1, wherein the location-specific information comprises one or more of population, age, race, housing, family arrangements, internet and computer usage, education, health, economy, or income.

3. The method of claim 1, wherein the target attributes comprises one or more of throughput or CPU utilization.

4. The method of claim 1, further comprising using a feature vector extractor to:

combine high-dimensional demographic data and field call models and transform the combined data into a low-dimensional space;

analyze data in the low-dimensional space; and label the analyzed data with call model attribute values.

5. The method of claim 4, wherein transforming the combined data comprises using Principal Component Analysis.

6. The method of claim 5, further comprising determining an optimal number of clusters using the Elbow method and applying a K-Means algorithm to cluster the data.

7. The method of claim 1, wherein the cluster of different machine learning models are trained by a dynamic call model characteristic predictor trainer, wherein feature vectors are trained to dynamic call model characteristics with a machine learning model for each target attribute.

8. The method of claim 7, wherein sites are grouped based on user behavior obtained from the dynamic call model and by using clustering algorithms.

9. The method of claim 8, wherein the clustering algorithms comprise one of K-means clustering, hierarchical clustering, DBSCAN, and Gaussian mixed models.

10. The method of claim 7, wherein the feature vectors are divided into training data used to train a regression model and wherein test data is used to evaluate a final model.

11. The method of claim 1, wherein an optimal machine learning model is obtained by tuning hyperparameters.

12. The method of claim 1, further comprising using ensemble models to improve machine learning results and predictive performance.

13. The method of claim 7, wherein for each call model characteristic that is input to the dynamic call model characteristic predictor trainer, an ML model is generated for each of a selected time period to incorporate trends in usage throughout a predetermined time period.

14. A computing system, comprising:

one or more processors; and a computer-readable storage medium having computer-executable instructions stored thereupon which, when executed by the processor, cause the computing system to perform operations comprising:

accessing site data indicative of a location where a user plane and control plane is to be deployed in a telecommunications network, wherein the site data comprises location-specific information associated with the location;

inputting the site data to a dynamic call model predictor, wherein the dynamic call model predictor comprises a plurality of different machine learning models that are each configured to generate a dynamic call model characteristic associated with one of a plurality of target attributes indicative of capabilities of the telecommunications network;

merging the dynamic call model characteristics generated by the plurality of different machine learning models of the dynamic call model predictor into a dynamic call model; and using the dynamic call model to allocate computing and network capacity in the telecommunications network.

15. The computing system of claim 14, wherein the location-specific information comprises one or more of population, age, race, housing, family arrangements, internet and computer usage, education, health, economy, or income.

16. The computing system of claim 14, wherein the target attributes comprises one or more of throughput or CPU utilization.

17. A computer-readable storage medium having computer-executable instructions stored thereupon which, when executed by a processor of a computing system, cause the computing system to perform operations comprising:

receiving site data indicative of a location where a user plane and control plane is to be deployed in a telecommunications network, wherein the site data comprises location-specific information associated with the location;

receiving a plurality of target attributes indicative of capabilities of the telecommunications network;

inputting the site data to a dynamic call model predictor, wherein the dynamic call model predictor comprises a plurality of different machine learning models that are each configured to generate a dynamic call model characteristic associated with one of the plurality of target attributes;

merging the dynamic call model characteristics generated by the plurality of different machine learning models of the dynamic call model predictor into a dynamic call model, wherein the dynamic call mode characteristics are merged to correspond to a representation of computing and network resources of the telecommunications network; and outputting the dynamic call model to allocate computing and network capacity in the telecommunications network.

18. The computer-readable storage medium of claim 17, further comprising computer-executable instructions stored thereupon which, when executed by the processor, cause the computing system to perform operations comprising:

using a feature vector extractor to:

combine high-dimensional demographic data and field call models and transform the combined data into a low-dimensional space;

analyze data in the low-dimensional space; and label the analyzed data with call model attribute values.

19. The computer-readable storage medium of claim 18, wherein transforming the combined data comprises using Principal Component Analysis.

20. The computer-readable storage medium of claim 19, further comprising computer-executable instructions stored thereupon which, when executed by the processor, cause the computing system to perform operations comprising:

determining an optimal number of clusters using the Elbow method and applying a K-Means algorithm to cluster the data.

* * * * *